(12) United States Patent
Lock et al.

(10) Patent No.: US 9,163,151 B2
(45) Date of Patent: Oct. 20, 2015

(54) COATING COMPOSITION FOR A FOOD OR BEVERAGE CAN

(71) Applicant: PPG Industries Ohio, Inc., Cleveland, OH (US)

(72) Inventors: Kam Lock, London (GB); M. Laudine Ducrocq, Gonfreville-l'Orcher (FR); Jean-Luc Maral, Gonfreville-l'Orcher (FR); Gregory Smets, Gonfreville-l'Orcher (FR)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/362,006

(22) PCT Filed: Dec. 3, 2012

(86) PCT No.: PCT/EP2012/074228
§ 371 (c)(1),
(2) Date: May 30, 2014

(87) PCT Pub. No.: WO2013/079718
PCT Pub. Date: Jun. 6, 2013

(65) Prior Publication Data
US 2014/0323640 A1    Oct. 30, 2014

(30) Foreign Application Priority Data

Dec. 2, 2011    (EP) .................................. 11191799

(51) Int. Cl.
*B65D 17/00*    (2006.01)
*C09D 7/12*    (2006.01)
*C08K 5/544*    (2006.01)
*C09D 133/06*    (2006.01)
*C09D 133/02*    (2006.01)
*C08K 5/5435*    (2006.01)

(52) U.S. Cl.
CPC ............ *C09D 7/1233* (2013.01); *C09D 133/02* (2013.01); *C09D 133/06* (2013.01); *C08K 5/544* (2013.01); *C08K 5/5435* (2013.01)

(58) Field of Classification Search
CPC .... C08K 5/5435; C08K 5/544; C09D 7/1233; C09D 133/06; B65D 17/02
USPC ........ 525/102, 902; 428/34.1, 461; 427/388.1
See application file for complete search history.

(56) References Cited

U.S. PATENT DOCUMENTS

| 5,128,391 | A | * | 7/1992 | Shustack ......................... 522/92 |
| 5,714,532 | A | * | 2/1998 | Osterholtz et al. ............ 524/114 |
| 2009/0227705 | A1 | | 9/2009 | Bochnik et al. |

FOREIGN PATENT DOCUMENTS

EP    0985718 A2    3/2000

\* cited by examiner

*Primary Examiner* — Vu A Nguyen
(74) *Attorney, Agent, or Firm* — Kate Hickinson; Diane R. Meyers

(57) ABSTRACT

A two component coating composition, suitable for coating onto a metal substrate, especially food and beverage cans, the coating composition comprising:
  a first component comprising an acrylic latex material; and
  a second component comprising a functional silane material.

10 Claims, No Drawings

COATING COMPOSITION FOR A FOOD OR BEVERAGE CAN

The present invention relates to a coating composition. In particular, the present invention relates to a two component coating composition suitable for deposition onto a metal substrate. In one embodiment, the present invention relates to a coating composition for repairing a score line on a coated metal substrate and to a method of repairing the score line incorporating the use of the coating composition.

Metal containers are being equipped more and more with so-called easy open ends in which a user accesses the interior of the container by piercing the container in a predetermined manner, without the need for a separate opening device. Such easy open ends are routinely used in food and beverage cans.

The principle of easy opening is obtained by reducing the thickness of the metal to thereby provide a score line which is weaker and susceptible to opening. During the scoring operation, which is often achieved by stamping with a punch, the external varnish layer is cut and therefore the corrosion resistance of the metal substrate is compromised. This is particularly problematic in a context where:
i) the metal has been stressed and therefore its resistance to corrosion is weakened
ii) the tin layer of the tinplate (where this is the substrate) is also cut; and/or
iii) the next treatment step of the packaging is sterilisation, where the presence of heat and high humidity will create high corrosion conditions
iv) The container is at the beginning of its life cycle which has a minimum of two years.

The corrosion resistance of the metal substrate is restored by the application of a repair coating to the score line. This coating is often applied by spraying and in particular an airless spray process.

Current repair formulations are generally based on a cross-linkage of an epoxy resin, usually of low molecular weight, by poly(amido amine)s. These compositions are characterised by high volatile organic compounds (VOC), a low cross-linkage speed and a limited pot life (from a few hours to a week). Furthermore, since these compositions are based on epoxy chemistry, they often contain Bisphenol A (4,4'-(propane-2,2-diyl)diphenol, also known as BPA) or derivatives thereof.

Therefore, present compositions may have drawbacks. In particular, it is desired to provide such coatings that have a reduced amount of BPA or derivatives thereof.

Also it is desired to provide coatings with reduced levels of volatile organic content (VOC) when compared to the current compositions.

It is an object of embodiments of the present invention to provide a solution to the above mentioned or other problems.

According to a first aspect of the present invention there is provided a two component coating composition suitable for coating onto a metal substrate, the coating composition comprising:
a first component comprising an acrylic latex material; and
a second component comprising a functional silane material.

Suitably, the acrylic latex material comprises an aqueous emulsion of one or more acrylic polymers.

Suitably, the acrylic latex material is formed from a reaction mixture, the reaction mixture may comprise one or more $C_1$ to $C_6$ alkyl (meth)acrylate material, suitably more than one $C_1$ to $C_6$ alkyl (meth)acrylate material. Examples of suitable $C_1$ to $C_6$ alkyl (meth)acrylate materials include methyl acrylate; methyl (meth)acrylate; ethyl acrylate; ethyl (meth)acrylate; propyl acrylate; propyl (meth)acrylate; butyl acrylate; butyl (meth)acrylate. The $C_1$ to $C_6$ alkyl (meth)acrylate may comprise one or more functional group, such as an epoxy group. For example the $C_1$ to $C_6$ alkyl (meth)acrylate may comprise glycidyl methacrylate.

The acrylic polymer(s) each suitably comprise a homopolymer or copolymer of at least one $C_1$ to $C_6$ alkyl (meth)acrylate monomer.

Unless stated otherwise, it should be understood that reference herein to (meth)acrylate indicates that the (meth) group is optional.

Suitably, the reaction mixture further comprises an $\alpha\beta$ ethylenically unsaturated carboxylic acid or anhydride, Particularly suitable $\alpha\beta$ ethylenically unsaturated carboxylic acid or anhydride are acrylic acid or methacrylic acid.

The reaction mixture may further comprise one or more ethylenically unsaturated monomer(s). In one embodiment, the reaction mixture may comprise an aryl substituted ethylenically unsaturated monomer, such as styrene, for example.

In one embodiment, the acrylic latex material comprises an aqueous dispersion of an acrylic material in a core/shell arrangement.

The shell may be formed from a plurality of components, which may be referred to as a shell mixture. The shell mixture suitably comprises one or more $\alpha\beta$ ethylenically unsaturated carboxylic acid such as methacrylic acid, for example. The shell mixture may further comprise one or more $C_1$ to $C_6$ alkyl (meth) acrylate, such as methyl acrylate, ethyl acrylate or butyl acrylate, a particularly suitable $C_1$ to $C_6$ alkyl (meth) acrylate is ethyl acrylate. The shell mixture may further comprise one or more ethylenically unsaturated monomer, such as an aryl substituted ethylenically unsaturated monomer, such as styrene, for example.

The shell mixture may further comprise one or more free radical initiators, particularly initiators which are soluble in the monomer mixture, such as a peroxy or peroxyester functional substances. Typical examples of suitable free radical initiators of this type include, tertiary butyl perbenzoate, tert butyl peroxy 3,5,5 trimethylhexanoate, tertiary butyl peroxy 2-ethyl hexanoate, di tertiary butyl peroxide and tertiary butyl per acetate. Other suitable initiator materials include azo type initiators, typical examples are 2,2'-azobis(isobutyronitrile), 2,2'-Azobis(2-methylbutyronitrile), 2,2'-Azobis(2.4-dimethyl valeronitrile) and 2,2'-Azobis(4-methoxy-2.4-dimethyl valeronitrile).

Suitably, the shell mixture is caused to undergo polymerisation to form a shell polymer. The polymerisation of the shell mixture is typically carried out as a free radical initiated solution polymerisation in a solvent or mixture of solvents. The solvents which may be used in this process include one or more of the following: alcohols such as n-butanol, pentanol or hexanol; or glycol ethers such as 2-butoxy ethanol, 1-methoxy propan-2-ol or dipropylene glycol mono methyl ether.

Polymerisation may be carried out at an elevated temperature. Typically the polymerisation may be carried out in the range 80° C. to 150° C. The polymerisation can be effectively carried out by adding the shell mixture, over a set time period, to the solvent mixture. In one embodiment, the shell mixture may be caused to undergo polymerisation to form a shell polymer prior to contact with components of the core mixture.

Where the shell mixture comprises one or more $\alpha\beta$ ethylenically unsaturated carboxylic acid, the shell polymer will have pendant carboxylic acid functional groups. This may be referred to a carboxylic acid functional shell polymer.

The carboxylic acid functional shell polymer may be contacted with a base to form a water dispersible salt. The carboxylic acid functionality in the carboxylic acid functional shell polymer may be at least partly neutralised with the base. Typically at least 10% of the available carboxylic acid groups are neutralised. In one embodiment, substantially all of the available carboxylic acid groups are neutralised by the base. Suitably, the base used for this neutralisation comprises an amine functional material, or a mixture of amine functional materials. Examples of suitable amine functional materials include ammonia, triethylamine, diethylamine, trimethylamine and morphline or hydroxy amine materials such as ethanol amine, N-methyl ethanol amine and N,N di methyl ethanolamine.

The shell polymer may be dispersed in aqueous medium. Suitably, the shell polymer may be dispersed in aqueous medium. In this manner, an aqueous dispersion or solution of the shell polymer may be formed.

In another embodiment, the shell mixture is caused to undergo polymerisation to form a shell polymer by dispersion polymerisation in an aqueous medium, thereby forming an aqueous dispersion or solution of the shell polymer.

The core may be formed from plurality of components, which may be referred to as a core mixture. Suitably, the core mixture comprises one or more $C_1$ to $C_6$ alkyl (meth) acrylate, such as one or more of methyl acrylate, ethyl acrylate or butyl acrylate, a particularly suitable $C_1$ to $C_6$ alkyl (meth)acrylate is ethyl acrylate. The core mixture may further comprise a functional $C_1$ to $C_6$ alkyl (meth) acrylate. For example, the $C_1$ to $C_6$ alkyl (meth) acrylate may comprise epoxy functionality, such as gylcidylmethacrylate; hydroxy functionality, such as either of hydroxy ethyl methacrylate or 2 hydroxy ethyl acrylate; or alkyl methylol functionality, such as n-butoxymethyl acrylamide. The core mixture may further comprise one or more ethylenically unsaturated monomer, such as an aryl substituted ethylenically unsaturated monomer, such as styrene, for example.

The polymer formed from the shell mixture, such as an aqueous dispersion thereof, may serve as a dispersant for a subsequent polymerisation, which may be a polymerisation of an $\alpha,\beta$ ethylenically unsaturated monomer mixture, such as the core mixture.

The core mixture may further comprise one or more free radical initiators, particularly suitable are initiators that are generally soluble in the monomer mixture, such as peroxy or peroxyester functional substances. Typical examples of free radical initiators of this type include, tertiary butyl perbenzoate, tert butyl peroxy 3,5,5 trimethylhexanoate, tertiary butyl peroxy 2-ethyl hexanoate, di tertiary butyl peroxide, and tertiary butyl per acetate. Other suitable oil soluble initiator materials include azo type initiators, such as: 2,2'-azobis(isobutyronitrile), 2,2'-Azobis(2-methylbutyronitrile), 2,2'-Azobis(2.4-dimethyl valeronitrile) and 2,2'-Azobis(4-methoxy-2.4-dimethyl valeronitrile). Free radical initiators which are water soluble may also be used such as, for example: azo type initiators such as 2,2'-Azobis[N-(2-carboxyethyl)-2-methylpropionamidine]hydrate, 2,2'-Azobis[2-(2-imidazolin-2-yl)propane]dihydrochloride and 2,2'-Azobis(2-methylpropionamidine)dihydrochloride. Other examples of suitable water soluble free radical initiators include materials such as hydrogen peroxide, tert butyl hydroperoxide or mixtures such as hydrogen peroxide and benzoin or the redox initiators such as the mixture tert-butyl hydroperoxide, erythrobic acid and ferrous complexes. Water soluble persulphate initiators such as ammonium persulphate, sodium persulphate or potassium persulphate can be used.

Suitably, the core mixture is caused to undergo polymerisation suitably at a temperature in the range of between about 30° C. to 99° C., particularly in the range of between about 50° C. to 95° C. and most suitably in the range of between about 80° C. to 90°. Polymerisation of the core mixture may occur in the presence of the polymer formed by polymerisation of the shell mixture to thereby form a core/shell polymer, typically by dispersion polymerisation. A typical polymerisation may be carried out by adding the core mixture, at a controlled rate over a period of time, to an aqueous dispersion of shell polymer, During the polymerisation the mixture may be mixed, such as by stirring and the temperature may be held generally constant.

Other methods to polymerise the core mixture include, but are not limited to, mixing all or part of the core ethylenically unsaturated substances with the aqueous dispersion of shell polymer and then adding the remaining core components, including free radical initiator, to the resulting mixture over a set period of time. Suitable temperatures for this type of process are typically in the range 50° C. to 95° C.

For the Core/Shell latex composition the ratio of the core mixture (monomers and initiator) to shell mixture (monomers and initiator) is typically between about 20:80 and 90:10 by weight. Suitably, the ratio of the core mixture to shell mixture is between about 60:40 and 80:20 by weight, particularly suitably the ratio of the core mixture to shell mixture components is between about 70:30 and 75:25.

In another embodiment the latex material comprises an aqueous dispersion of an acrylic material with reactive functional groups and stabilized with an emulsifier or surfactant material.

In such an embodiment, the emulsifier may be an anionic, cationic or non ionic type stabilizer. Typical examples of anionic emulsifiers include alkyl sulphates, such as sodium dodecyl sulphate or sodium polyoxy ethylene alkyl ether sulphate or aryl sulphonates such as sodium dodecylbenzene sulphonate. Other examples of anionic emulsifiers include the sulphosuccinates examples of which include the compounds sodium diisobutyl sulpho succinate, sodium dioctyl sulpho succinate and sodium di cyclohexyl sulpho succinate. Examples of nonionic emulsifiers include fatty alcohol ethoxylates such as poly ethylene glycol mono lauryl ether or fatty acid ethoxylates such as polyethylene glycol mono stearate or polyethylene glycol mono laurate or polyether block polymers such as polyethylene glycol/polypropylene glycol block polymers also known as pluronics, typical commercial products of this type include Tergitol XJ, XH or XD from Dow Chemical. Examples of Cationic emulsifiers include amine salts such as cetyl trimethyl ammonium chloride or benzyl dodecyl dimethyl ammonium bromide. It should also be noted that mixtures of anionic and cationic emulsifiers would not be desirable.

The acrylic latex material according to the present embodiment may be formed from a reaction mixture, the reaction mixture may comprise one or more $C_1$ to $C_6$ alkyl (meth) acrylate material, suitably more than one $C_1$ to $C_6$ alkyl (meth)acrylate material. Examples of suitable $C_1$ to $C_6$ alkyl (meth)acrylate materials include methyl acrylate; methyl (meth)acrylate; ethyl acrylate; ethyl (meth)acrylate; propyl acrylate; propyl (meth)acrylate; butyl acrylate; butyl (meth) acrylate. The $C_1$ to $C_6$ alkyl (meth)acrylate may comprise a functional $C_1$ to $C_6$ alkyl (meth) acrylate. For example, the $C_1$ to $C_6$ alkyl (meth) acrylate may comprise epoxy functionality, such as gylcidylmethacrylate; hydroxy functionality, such as either of hydroxy ethyl methacrylate or 2 hydroxy ethyl acrylate; or alkyl methylol functionality, such as n-butoxymethyl acrylamide.

In some cases the reaction mixture further comprises an α,β ethylenically unsaturated carboxylic acid or anhydride, preferably acrylic acid or methacrylic acid.

The reaction mixture may further comprise one or more ethylenically unsaturated monomer(s). In one embodiment, the reaction mixture may comprise an aryl substituted ethylenically unsaturated monomer, such as styrene.

The reaction mixture of α,β ethylenically unsaturated compounds may be polymerised to form the acrylic latex using free radical initiators. Free radical initiators which are water soluble are commonly used in emulsifier stabilised Latex compositions as one or more of the free radical initiators for polymerization. Examples of this type of initiator include azo type initiators such as 2,2'-Azobis[N-(2-carboxyethyl)-2-methylpropionamidine]hydrate; 2,2'-Azobis[2-(2-imidazolin-2-yl)propane]dihydrochloride and 2,2'-Azobis(2-methylpropionamidine)dihydrochloride. Other examples of water soluble free radical initiators include materials such as hydrogen peroxide or mixtures such as hydrogen peroxide and benzoin or the redox initiators such as the mixture tert-butyl hydroperoxide, erythrobic acid and ferrous complexes. Water soluble persulphate initiators such as ammonium persulphate, sodium persulphate or potassium persulphate can be used.

In some polymerisations, initiators which are soluble in the monomer mixture or so called oil soluble initiators can be used, such as peroxy or peroxyester functional substances. Typical examples of free radical initiators of this type include, tertiary butyl perbenzoate, tert butyl peroxy 3,5,5 trimethyl-hexanoate, tertiary butyl peroxy 2-ethyl hexanoate, di tertiary butyl peroxide, and tertiary butyl per acetate. Other oil soluble initiator materials include azo type initiators, typical examples are 2,2'-azobis(isobutyronitrile), 2,2'-Azobis(2-methylbutyronitrile); 2,2'-Azobis(2.4-dimethyl valeronitrile) and 2,2'-Azobis(4-methoxy-2.4-dimethyl valeronitrile).

Polymerization may be carried out at temperatures in the range of between about 30° C. to 99° C., preferably in the range 50° C. to 95° C. and most preferably in the range 75° C. to 90° C. The temperature is typically held constant throughout the polymerization process.

The process of forming the emulsifier stabilised latex polymer can be achieved in a number of ways. In all cases the emulsifier is mixed with water and the mixture heated to the polymerisation temperature, as the first part of the process. In some process methods all of the monomer components can be mixed with water and emulsifier at the start of the process and then, when at temperature, the initiator materials can be added to the reaction mixture either continuously or in portions over a set time period. An alternative process is for all of the monomer mixture and the initiator mixture to be added to the mixture of emulsifier and water over a set time period at a constant rate. Other alternative process methods utilise a combination of these techniques, in so much as a part of the monomer mix or initiator (or both) is added to the emulsifier and water mixture at the start of polymerisation. The remaining monomer mix and initiator is then added to the reaction mixture over a set time period whilst maintaining a pre determined temperature. The appropriate process method which provides a stable latex material with the desired characteristics, from the chosen reaction components is utilised The term polymer as used herein refers to a homopolymer or copolymer unless otherwise stated. Furthermore, the term copolymer refers to a polymer formed from two or more different monomers. For example, the term copolymer as used herein refers to a polymer that may be formed from 2, 3, 4, 5 or more different monomers.

The functional silane material comprises one or more functional groups. It is believed that the functional groups allow the coating to adhere to the metal substrate, although the inventors do not wish to be bound by this. Such functional groups may include one or more of methoxy, ethoxy, alkoxy, hydroxy, methyldimethoxy, methoxy-ethoxy, methyldimethoxy, ethyltrimethoxy for example.

The functional silane material may be any silane material comprising a molecule having a single or multiple silicon atoms. This includes polysilanes, polysiloxanes or other silicon containing polymers.

In other embodiments, the functional silane material comprises functional groups that react with the acrylic latex material. Such functional groups include aminopropyl, aminoethyl-aminopropyl, phenyl-aminopropyl, benzylamine, phenyl, vinyl, vinyltrichloro, vinylbenzylamine, glycidoxypropyl, methacrylate, isocyanate, 3,4-epoxycyclohexyl, methacryloxypropyl, methacrylamido, chloropropyl, an alkyl chain (branched or linear) containing 1 to 12 carbon atoms, or epoxy, for example.

In one embodiment, the functional silane material comprises an epoxy functional group. In an alternative embodiment, the functional silane material comprises a hydroxyl or alkoxyl functional group.

In one embodiment, the functional silane material comprises at least two functional groups. The at least two functional groups may be different functional groups. In such an embodiment, the functional silane material may comprise one or more epoxy functional group and one or more hydroxy or alkoxy functional group.

In one embodiment, the functional silane material comprises a silane material according to Formula I, or a polysiloxane polymer derived from one or more silane material according to Formula I:

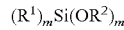

wherein each $R^1$ is independently selected from an epoxy functional optionally substituted alkyl group,
each $R^2$ independently represents H or an alkyl group
n=1 to 3,
m=1 to 3; and
n+m=4.

Suitably, each $R^2$ may be independently selected from H, methyl, ethyl, propyl or butyl, particularly suitably H, methyl or ethyl.

Each optionally substituted alkyl group in $R^1$ may be independently selected from any optionally substituted $C_1$ to $C_{12}$ alkyl group.

In one embodiment, each $R^1$ is independently selected from an epoxy alkyl or an epoxy alkyl ether.

The functional silane material may comprise γ-glycidyloxypropyl trialkoxy silane, such as γ-glycidyloxypropyl trimethoxy silane, for example.

In one embodiment, the functional silane material may comprise one or more amine functional groups and, optionally one or more hydroxy or alkoxy functional group.

In one embodiment, the functional silane material comprises a silane material according to Formula 2, or a polysiloxane polymer derived from one or more silane material according to Formula 2:

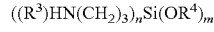

wherein each $R^3$ is independently selected from H or an optionally substituted alkyl group,
each $R^4$ independently represents H or an alkyl group
n=1 to 3,
m=1 to 3; and
n+m=4.

Suitably, each $R^4$ may be independently selected from H, methyl, ethyl, propyl or butyl, particularly suitably H, methyl or ethyl.

Each $R^3$ may be independently selected from H or any optionally amine substituted $C_1$ to $C_{12}$ alkyl group.

In one embodiment, each $R^3$ is independently selected from H or a primary amine alkyl The functional silane material may comprise an γ-amino propyl trialkoxy silane such as γ-amino propyl trimethoxy silane or an α-aminoethylaminopropyl trialkoxy silane, such as α-aminoethylaminopropyl trimethoxy silane (N-(3-(Trimethoxysilyl)propyl)ethylenediamine), for example.

The second component may further comprise at least one solvent, which may be an organic solvent.

Suitably, the coating composition when the two components are combined to form one coating composition; comprises the acrylic latex material and the functional silane material in a ratio of latex solids to silane solids of between about 99:1 parts by wt to 1:99 parts by wt, especially in a ratio of between about to 60:40 parts by wt to 95:5 parts by wt and more suitably in a ratio of between about 75:25 parts by wt to 90:10 parts by wt. In one embodiment, the coating composition comprises the acrylic latex material and the functional silane material in a ratio of latex solids to silane solids of between about 78:22 parts by wt to 85:15 parts by wt.

In a preferred embodiment of the current invention the two component coating is applied as a repair coating for component parts of food and beverage cans. A particularly preferred use is as a repair coating for a full aperture easy open end for food cans. This end component is repair coated, after fabrication, by airless spraying of the material on to the exterior of the score line. Other uses as repair coatings include the coating of seams and welds, such as side seams for which the coating may be applied to the area by spraying (airless or air driven) or roller coating. Repair coating can also include protection of vulnerable areas where corrosion may be likely due to damage, these areas include flanges, rims and bottom rims where the coating may be applied by spraying, roller coating flow or dip coating.

In certain embodiments, the coating compositions of the present invention, may be substantially free, may be essentially free and/or may be completely free of bisphenol A and derivatives or residues thereof, including bisphenol A ("BPA") and bisphenol A diglycidyl ether ("BADGE"). Such coating compositions are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and derivatives or residues thereof, including bisphenol F and bisphenol F diglycidyl ether ("BFDGE"). The term "substantially free" as used in this context means the coating compositions contain less than 1000 parts per million (ppm), "essentially free" means less than 100 ppm and "completely free" means less than 20 parts per billion (ppb) of any of the above mentioned compounds, derivatives or residues thereof.

According to a second aspect of the present invention there is provided a food or beverage can comprising a surface having a coating on at least a portion thereof, the coating being formed from a two component coating composition according to the first aspect According to a third aspect of the present invention there is provided a method of repairing a food or beverage can, the method comprising coating a portion of the food or beverage can with a two component coating composition according to the first aspect.

It has been surprisingly and advantageously found by the present inventors that the two component coating composition of the present invention provides a very clear coating with no perceptible yellowing of the coating. This is extremely advantageous in that the coating composition, which is often used to repair a score line, is substantially not visible to an end user. Therefore, according to a further aspect of the present invention there is provided the use of two component coating composition according to the first aspect for reducing yellowing.

It has also surprisingly and advantageously been found by the present inventors that the addition of a functional silane material may significantly reduce the curing time of the coating composition. Therefore, according to a yet further aspect of the present invention there is provided the use of a functional silane in a second component of a two component coating composition for reducing curing time of the coating.

Preferably, the first component in the two component coating material comprises an acrylic latex material.

A yet further surprising element of the present invention is the that the addition of a functional silane material may significantly reduce the curing temperature of the coating composition. Therefore, according to a yet further aspect of the present invention there is provided the use of a functional silane in a second component of a two component coating composition for reducing the curing temperature of the coating. Preferably, the first component of the two component coating composition comprises an acrylic latex material.

All of the features contained herein may be combined with any of the above aspects and in any combination.

For a better understanding of the invention, and to show how embodiments of the same may be carried into effect, reference will now be made, by way of example, to the following experimental data.

EXAMPLES

The following examples are intended to illustrate the invention and should not be construed as limiting the invention in any way.

Polymer Examples

Core/shell latex emulsions were formed as follows.

Shell Polymer Example 1

The ingredients of this shell polymer example are displayed in Table 1 below.

TABLE 1

| Item no | Component | Parts (by weight) |
|---|---|---|
| 1 | Propylene glycol mono methyl ether | 6.00 |
| 2 | Butyl glycol | 11.88 |
| 3 | Trigonox 42S* | 0.50 |
| 4 | Butyl glycol | 3.00 |
| 5 | Methacrylic acid | 11.25 |
| 6 | Ethyl acrylate | 6.25 |
| 7 | Styrene | 7.50 |
| 8 | Butyl glycol | 1.00 |
| 9 | Trigonox 42S* | 0.25 |
| 10 | Butyl glycol | 1.50 |
| 11 | Butyl glycol | 0.50 |
| 12 | De-ionized water | 5.83 |

TABLE 1-continued

| Item no | Component | Parts (by weight) |
|---|---|---|
| 13 | Dimethylethanolamine** | 5.83 |
| 14 | De-ionized water | 38.73 |

*= tert-Butyl peroxy-3,5,5-trimethylhexanoate
**= the amine used to neutralise the polymer Process Method The polymerisation was carried out using a reaction vessel equipped with heating, cooling, stirring and a reflux condenser. A sparge of nitrogen was applied to the reactor to provide an inert atmosphere, stirred vessels for mixing and addition of monomers (a monomer tank) and free radical initiators (an initiator tank) were available and linked to the reaction vessel by pumps which could be used to control the addition rate. Items 1 and 2 were added to the reaction vessel and heated to 140° C. Whilst the vessel was heating to temperature items 3 and 4 were mixed in the initiator tank and items 5, 6 and 7 were mixed in the monomer tank. With the contents of the reactor maintained at a temperature of 139 to 140° C. the contents of the initiator tank and monomer tank were simultaneously added to the reactor at a constant rate over a period of 150 minutes. After the addition was completed the contents of the reactor were held at 139 to 140° C., then item 8 was added to the reactor from the monomer tank as a line wash. Items 9 and 10 were added to the initiator tank. After holding the reactor contents at 139-140° C. for 30 minutes 50% of the contents of the initiator tank (items 9 and 10) were added as rapidly as possible to the reactor and the temperature of the reactor held at 139 to 140° C. for a further 30 minutes. The remaining contents of the initiator tank were then added and item 11 added to the reactor via the initiator tank as a line wash. The contents of the reactor were then maintained at 139 to 140° C. for a further 90 minutes. The reactor contents were then cooled to 98° C., items 12 and 13 were mixed and the mixture was carefully added to the reactor over a period of 15 minutes. After thorough mixing of the contents of the reactor item 14 was added to produce a translucent or slightly hazy solution like material which was cooled to 25° C. and filtered ready for use in further polymerisation.

The polymer obtained by the above example had the following characteristics:

| | |
|---|---|
| solids content | 28.9% (180° C., 30 minutes 0.5 gm) |
| viscosity | 504 centipoise (Brookfield DVII pro viscometer spindle 3, 50 rpm @ 25° C.) |
| acid value | 69.6 (mgKOH/gm on total sample) |

This Shell polymer, also sometimes referred to as soap, can be used in various core/shell latex systems. One example is detailed in table 2.

Latex Example 1

TABLE 2

| Item | Component | Parts (by weight) |
|---|---|---|
| 1 | Shell polymer example 1 [1] | 25.38 |
| 2 | De-ionized water | 55.02 |
| 3 | Styrene | 6.80 |

TABLE 2-continued

| Item | Component | Parts (by weight) |
|---|---|---|
| 4 | Ethyl acrylate | 9.54 |
| 5 | Glycidyl methacrylate | 1.32 |
| 6 | Trigonox 21[2] | 0.18 |
| 7 | De-ionized water | 1.68 |
| 8 | Trigonox 21[2] | 0.04 |
| 9 | Trigonox 21[2] | 0.04 |

[1] = the soap formed from the reaction components in Table 1, above
[2] = the radical initiator = tert-Butyl peroxy-2-ethylhexanoate Process Method Items 1 and 2 were placed in a reaction vessel equipped with heating, cooling, stirring and a simple reflux condenser. The vessel was also supplied with a nitrogen sparge to maintain an inert atmosphere and also attached were stirred addition tanks which could be employed to add αβ unsaturated monomers and initiator. The mixture in the reaction vessel was heated to 85° C. and held at that temperature. Items 3 to 6 were mixed in a stirred addition tank and then added to the vessel over a period of 2 hours, whilst maintaining the temperature of the contents of the vessel at 85° C. After the addition was complete item 7 was added to the vessel via the stirrer addition tank as a line wash. The vessel was maintained at 85° C. for 30 minutes and then item 8 was added. The vessel was maintained at temperature for a further 1 hour before item 9 was added and the vessel was then maintained at 85° C. for a further 2 hours. Finally the contents of the vessel were cooled to 40 C and discharged with filtration prior to the use of this material, Latex example 1, in the preparation of coatings.

The characteristics of the Latex produced in Latex example 1 were determined as follows:

| | |
|---|---|
| Solids content | 25.4% (110° C., 60 minutes 0.5 gm) |
| Viscosity | 15 seconds (Ford 4 cup @25° C.) |
| Particle size | 167.4 nanometers (Z average value, determined with diluted sample using Malvern Zetasizer Nano ZS machine) |

The latex produced in this process is an example of a core shell latex dispersion, with a ratio of core to shell components of 73.3/26.7 wt %.

Coatings Examples

Preparation of Coatings

Coatings were prepared from the Latex polymers as described below. The coatings were prepared as two parts, Part A and Part B, which are stored separately as stable components. The two parts are then mixed in weight ratios as outlined below prior to application of the coating.

The tables below outline the components of each of the parts and also the mixture of the parts which make up the coating. All the quantities given in the tables are parts by weight.

TABLE 3A

|  | Components | Coating Example 1A | Coating Example 2A | Coating Example 3A |
|---|---|---|---|---|
| Part A | Latex Example 1 [1] | 85.92 | 82.29 | 0.00 |
|  | Alberdlngk AC 5503 [2] | 0.00 | 0.00 | 51.88 |
|  | Deionized Water | 13.36 | 16.83 | 47.08 |
|  | BYK-307 [3] | 0.41 | 0.50 | 0.65 |
|  | Optical Brightener [4] | 0.10 | 0.12 | 0.13 |
|  | BYK-024 [5] | 0.21 | 0.25 | 0.26 |

[1] = Core shell Latex from preparative example 1
[2] = Epoxy functional aqueous acrylic latex dispersion, commercially available from Alberdingk Boley GMBH, Krefeld Germany
[3] = silicone wetting agent, commercially available from BYK-Chemie GmbH, Wesel, Germany
[4] = Tinopal NFW Liq commercially available from BASF SE, Ludwigshafen, Germany
[5] = silicone defoamer, commercially available from BYK-Chemie GmbH, Wesel, Germany Table 3A outlines the components of a composition which makes up part A which is the latex containing part of the two part coating. Each of the examples was made by adding the components in order, as in the table, to a vessel stirred with a high speed mixer at 25° C. Mixing was continued for 10 minutes after the addition of components was complete.

TABLE 3B

|  | Components | Coating Example 1B | Coating Example 2B | Coating Example 3B |
|---|---|---|---|---|
| Part B | Epoxy-methoxy silane [6] | 100.00 | 20.00 | 0.00 |
|  | Amino-ethoxy silane [7] | 0.00 | 0.00 | 21.55 |
|  | Methoxypropanol | 0.00 | 55.00 | 78.45 |
|  | Acetone | 0.00 | 25.00 | 0.00 |

[6] = Silquest A-187 commercially available from Momentive Performance Materials Albany, NY, USA
[7] = Silquest A-1100 commercially available from Momentive Performance Materials Albany, NY, USA Table 3B outlines the components of a composition which makes up part B which is the functional silane containing part of the two part coating. Each of the examples was made by adding the components in order, as in the table, to a vessel stirred with a high speed mixer at 25° C. Mixing was continued for 10 minutes after the addition of components was complete.

TABLE 3C

|  | Components | Coating Example 1 | Coating Example 2 | Coating Example 3 |
|---|---|---|---|---|
| Coating Mixture | Coating Example 1A | 97 |  |  |
|  | Coating Example 2A |  | 80 |  |
|  | Coating Example 3A |  |  | 77 |
|  | Coating Example 1B | 3 |  |  |
|  | Coating Example 2B |  | 20 |  |
|  | Coating Example 3B |  |  | 23 |

Table 3C outlines the component parts and the amounts which are mixed to produce the final coatings. Thus Coating example 1 was prepared by mixing Coating example 1A (part A or the latex part) with Coating example 1B (part B or the functional silane containing part) in the weight proportions as given in the table. Other examples were prepared by combining part A and part B as outlined in table 3C.

Each of the Coating examples were made by adding component B to component A in a mixing vessel which was stirred with a high speed mixing blade at 500-1000 rpm at a temperature around 25° C. Mixing continued for 10 minutes after the addition was complete. After mixing each of the coatings was ready for use; stored at a temperature around 25° C. they remained in a useable state for around 50 hours.

Using the solids contents as determined for the latex materials discussed above, the proportion of latex solids and silane solids in each of the example coatings was calculated:

For coating example 1, the proportion of latex solids to silane solids by weight is 87.6 to 12.4. For coating example 2, the proportions of latex to silane solids by weight are 80.7 to 19.3 and for coating example 3, the latex to silane solids ratio is 80.3 to 19.7.

Coating Application and Drying

The Coatings from the coating examples outlined above and a commercial standard product were applied to a metal substrate, being a full aperture tinplate easy open end, such as those routinely used in food or beverage cans. The ends used were coated with clear, gold or white pigmented lacquer with print markings and had not been repair coated.

The coatings were applied with an airless spray gun in a strip 5-25 mm wide over the score line on the easy open end.

After application of the coatings the easy open ends were dried for one minute in a fan assisted oven at a temperature between 100° C. and 150° C. as outlined in tables 4 and 5 below. The drying process produces a cured film of the coating on the end which is tested, as outlined in the details below, to demonstrate the performance of the protective coating applied to the score line as a repair layer.

Details of Methods for Testing Coatings

The performance of the coatings are evaluated in the following ways:

The coating is evaluated using a test for bubbles, blush, adhesion and yellowing. Details of how these tests are performed and evaluated are given below.

Bubbles

After application and curing the formation of bubbles is evaluated. This is done by examining the score line with a microscope looking particularly for bubbles and defects which are trapped within the film or in the coating metal interface. The evaluation is rated between 0 and 5. Rating grade 0 corresponds to no bubbles seen along the score line and grade 5 corresponds to bubbles covering all of the score line.

Blush

Blush is white colouration of the film caused by water penetration and entrapment. To assess the resistance to blush the coated ends are sterilised in an autoclave for 1 hour at 130° C. in water and in water plus 1% teepol (sodium dodecyl benzene sulphonate, detergent) (as detergent) and the film is observed.

In the evaluation of the coating examples reported below the blush evaluation corresponds to sterilisation in the liquid phase (completely immersed in the solution) in water with 1% arylsulphosuccinate detergent for 1 hour at 130° C.

After sterilisation the appearance of the film is rated between 0 and 5. Grade 0 corresponds to perfect film appearance with no discernable attack. Grade 5 corresponds to complete attack of the film across the whole of the score line.

The industrial process for processing or sterilisation of cans containing various food stuffs often uses water which is treated with detergents such as arylsulphosuccinates. In some cases the industrial process can also use a 1% solution of Teepol in water. Hence, this test has particular relevance to the industrial use of the coatings that are under evaluation.

Adhesion

Film adhesion after sterilisation with water with 1% teepol (sodium dodecyl benzene sulphonate, detergent) for 1 hour at 130° C. is also checked. The coating is crosshatched and checked for removal with tape (3M 610 type tape). Grade 0 corresponds to good adhesion with no removal of coating and grade 5 to complete loss of adhesion as seen by complete removal of the coating with the tape.

Yellowing

To check yellowing the coating is applied on ends which are coated with white enamel and sterilized in water with 1% teepol (sodium dodecyl benzene sulphonate, detergent) for 1 hour at 130° C. Grade 0 corresponds to no yellowing and grade 5 to a high yellowing level.

Results of Testing of Coating Examples

The standard product and coating examples were prepared, applied and dried as outlined in the preceding descriptions. The coated ends obtained were then tested no later than 3 hours after completion of the drying process. The results of the testing and evaluation of the ends are compiled in Table 4. It should also be noted that for each coating ends were cured at three different temperatures (105° C., 120° C. and 150° C.) as outlined in the table.

TABLE 4

| | Film curing temperature | Bubbles | Blush | Adhesion after sterilisation | Yellowing |
|---|---|---|---|---|---|
| Standard from PPG (epoxy based solvent-borne product)[1] | 105° C. | 0 | 4 | 0 | 1 |
| | 120° C. | 0 | 3 | 0 | 1 |
| | 150° C. | 0 | 2 | 0 | 1 |
| Coating Example 1 | 105° C. | 0 | 2 | 0 | 0 |
| | 120° C. | 0 | 2 | 0 | 0 |
| | 150° C. | 0 | 2 | 0 | 0 |
| Coating Example 2 | 105° C. | 0 | 1 | 0 | 0 |
| | 120° C. | 0 | 1 | 0 | 0 |
| | 150° C. | 0 | 1 | 0 | 0 |
| Coating Example 3 | 105° C. | 0 | 1 | 0 | 0 |
| | 120° C. | 0 | 1 | 0 | 0 |
| | 150° C. | 0 | 1 | 0 | 0 |

[1]= PPG 2982-803/A + PPG 2982-804/A mix 1:1

The results in table 4 show that the standard product has poor blush performance particularly where the curing temperature used is low (105° C. and 120° C.). This is expected for the standard; in commercial production using products such as the standard employed here, the repaired easy open ends are held at a temperature around 22° C. for a period at least 24 hours to fully develop resistance properties. All of the coating examples under study at all of the temperatures show a better level of performance than the standard and have been shown to develop a good level of performance immediately after oven drying, with no need to age the coating. This offers an advantage, particularly in process costs, for the products under study compared to the standard.

Tables 5 below shows the results of tests on ends which have been stored at a temperature of 19 and 22° C. for 24 hours after oven drying. This storage or ageing process is applied in commercial use of the standard coating which is known not to develop its full performance immediately after drying. Tests were made for the standard and the coating examples under study after this storage time and the results should be compared to those in table 4

TABLE 5

| | Film curing temperature | Bubbles | Blush | Adhesion after sterilisation | Yellowing |
|---|---|---|---|---|---|
| Standard from PPG (epoxy based solvent-borne product)[1] | 105° C. | 0 | 2 | 0 | 1 |
| | 120° C. | 0 | 1 | 0 | 1 |
| | 150° C. | 0 | 1 | 0 | 1 |
| Coating Example 1 | 105° C. | 0 | 2 | 0 | 0 |
| | 120° C. | 0 | 2 | 0 | 0 |
| | 150° C. | 0 | 2 | 0 | 0 |
| Coating Example 2 | 105° C. | 0 | 1 | 0 | 0 |
| | 120° C. | 0 | 1 | 0 | 0 |
| | 150° C. | 0 | 1 | 0 | 0 |
| Coating Example 3 | 105° C. | 0 | 1 | 0 | 0 |
| | 120° C. | 0 | 1 | 0 | 0 |
| | 150° C. | 0 | 1 | 0 | 0 |

[1]= PPG 2982-803/A + PPG 2982-804/A mix 1:1

The results in table 5 when compared to those in table 4 show that the performance of the standard has changed and reached a good level of performance. This change was as expected for the commercial standard product. Whereas for all the coating examples under study the test results in table 4, immediately after cure, are the same as the results in table 5, after 24 hours ageing. The results in table 5 of all the coating examples under test are comparable with the standard.

In all of the examples under study the film is transparent and is colourless, as indicated by a score of 0 in the yellowing test, whereas the standard is known to be slightly yellowish, as indicated by a score of 1 in the yellowing test, giving the repair some visibility. Hence, the coatings under study offer another desirable advantage over the current commercial standard product, particularly where the ends are precoated with a pigmented white coating or colourless lacquer.

Thus in summary, it can be seen from the examples above that a coating composition made in accordance with the present invention provides a water based coating with lower volatile organic content (VOC), requires a lower curing temperature, does not need to be stored (or aged) to produce the desired protection performance and produces less yellowing compared to the current commercial standard product. Furthermore, it can be seen from the examples presented that in common with the current commercial standard product the coating composition made in accordance with the present invention provides a two comopnent coating with a workable life (after mixing of the components) of at least 12 hours, can be applied with airless spray equipment and provides sufficient protection to resist corrosion to the exposed metal score line which it has been applied to repair.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A food or beverage can comprising a surface having a coating on at least a portion thereof, the coating being formed from a two component coating composition, the coating composition comprising:
   a first component comprising an acrylic latex material; and
   a second component comprising a functional silane material.

2. A method of repairing a score line on a food or beverage can, the method comprising applying to the score line a two component coating composition, the coating composition comprising:
   a first component comprising an acrylic latex material; and
   a second component comprising a functional silane material.

3. A can according to claim 1, wherein the acrylic latex material comprises an aqueous emulsion of one or more acrylic polymers.

4. A can according to claim 1, wherein the acrylic latex material comprises an aqueous dispersion of an acrylic material in a core/shell arrangement.

5. A can according to claim 4, wherein the core is formed from a core mixture and the shell is formed from a shell mixture, and wherein the ratio of the core mixture (monomers and initiator) to shell mixture (monomers and initiator) is between about 20:80 and 90:10 by weight.

6. A can according to claim 1, wherein the latex material comprises an aqueous dispersion of an acrylic material with reactive functional groups and stabilized with an emulsifier or surfactant material.

7. A can according to claim 1, wherein the functional silane material comprises a silane material according to Formula I, or a polysiloxane polymer derived from one or more silane material according to Formula I:

$$(R^1)_n Si(OR^2)_m \qquad \text{I}$$

wherein each $R^1$ is independently selected from an epoxy functional optionally substituted alkyl group,
each $R^2$ independently represents H or an alkyl group
n=1 to 3,
m=1 to 3; and
n+m=4.

8. A can according to claim 1, wherein the functional silane material comprises a silane material according to Formula 2, or a polysiloxane polymer derived from one or more silane material according to Formula 2:

$$((R^3)HN(CH_2)_3)_n Si(OR^4)_m \qquad 2$$

wherein each $R^3$ is independently selected from H or an optionally substituted alkyl group,
each $R^4$ independently represents H or an alkyl group
n=1 to 3,
m=1 to 3; and
n+m=4.

9. A can according to claim 1, wherein the functional silane material comprises an epoxy functional silane or an amino functional silane.

10. A can according to claim 1, wherein the coating composition comprises the acrylic latex material and the functional silane material in a ratio of latex solids to silane solids of between about 99:1 parts by wt to 1:99 parts by wt.

* * * * *